US 10,526,913 B2

(12) United States Patent
Roberge (10) Patent No.: US 10,526,913 B2
(45) Date of Patent: Jan. 7, 2020

(54) ANTI-WINDMILLING SYSTEM FOR A GAS TURBINE ENGINE

(71) Applicant: United Technologies Corporation, Farmington, CT (US)

(72) Inventor: Gary D. Roberge, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 679 days.

(21) Appl. No.: 15/089,835

(22) Filed: Apr. 4, 2016

(65) Prior Publication Data

US 2017/0284220 A1    Oct. 5, 2017

(51) Int. Cl.
| | |
|---|---|
| *F02C 7/36* | (2006.01) |
| *F02C 3/107* | (2006.01) |
| *F01D 21/00* | (2006.01) |
| *F02C 7/32* | (2006.01) |
| *F02K 3/06* | (2006.01) |

(Continued)

(52) U.S. Cl.
CPC ............ *F01D 21/006* (2013.01); *F02C 3/107* (2013.01); *F02C 7/06* (2013.01); *F02C 7/32* (2013.01); *F02C 7/36* (2013.01); *F02C 9/00* (2013.01); *F02K 3/06* (2013.01); *F05D 2220/32* (2013.01); *F05D 2260/30* (2013.01); *F05D 2260/40311* (2013.01); *F05D 2260/532* (2013.01); *F05D 2260/902* (2013.01); *F05D 2260/903* (2013.01); *F05D 2260/98* (2013.01)

(58) Field of Classification Search
CPC .......... F01D 21/006; F02C 3/107; F02C 7/32; F02C 7/36; F02C 3/067; F02C 3/113; F05D 2260/40311; F05D 2260/532; F05D 2260/902; F05D 2260/903; F05D 2220/36; F02K 3/04; F02K 3/06
See application file for complete search history.

(56) References Cited

U.S. PATENT DOCUMENTS

| | | |
|---|---|---|
| 811,317 A | 1/1906 | Newton |
| 3,133,416 A | 5/1964 | Mock |
| 3,994,634 A | 11/1976 | Riddle et al. |

(Continued)

FOREIGN PATENT DOCUMENTS

| | | |
|---|---|---|
| EP | 1918564 | 5/2008 |
| EP | 2728140 | 5/2014 |
| WO | 2015060912 | 4/2015 |

OTHER PUBLICATIONS

European Search Report for Application No. 17164778.7 dated Aug. 23, 2017.

*Primary Examiner* — William H Rodriguez
(74) *Attorney, Agent, or Firm* — Carlson, Gaskey & Olds, P.C.

(57) ABSTRACT

A gas turbine engine includes a compressor having a first compressor section and a second compressor section, a combustor fluidly connected to the compressor, and a turbine fluidly connected to the combustor. The turbine has a first turbine section and a second turbine section. A first shaft connects the first compressor section and the first turbine section. A second shaft connects the second compressor section and the second turbine section. A fan is connected to the first shaft via a geared architecture. A low speed accessory gearbox is interfaced with the first shaft via a mechanical interface. The low speed accessory gearbox includes a mechanical brake.

17 Claims, 4 Drawing Sheets

(51) Int. Cl.
*F02C 7/06* (2006.01)
*F02C 9/00* (2006.01)

(56) References Cited

U.S. PATENT DOCUMENTS

| | | | |
|---|---|---|---|
| 5,494,421 A | 2/1996 | Wada et al. | |
| 7,621,117 B2 | 11/2009 | Dooley et al. | |
| 7,656,054 B2* | 2/2010 | Lardellier | F02C 7/32 |
| | | | 290/40 C |
| 7,671,117 B2 | 3/2010 | Sato et al. | |
| 7,849,668 B2 | 12/2010 | Sheridan | |
| 8,366,385 B2* | 2/2013 | Davis | F02C 3/113 |
| | | | 29/402.03 |
| 8,899,916 B2* | 12/2014 | McCune | F02K 3/04 |
| | | | 415/124.1 |
| 8,939,864 B2* | 1/2015 | McCune | F01D 5/027 |
| | | | 475/331 |
| 2002/0189231 A1* | 12/2002 | Franchet | F02C 3/113 |
| | | | 60/226.1 |
| 2005/0150204 A1* | 7/2005 | Stretton | F02C 7/047 |
| | | | 60/39.83 |
| 2006/0010875 A1* | 1/2006 | Mahoney | F02C 3/13 |
| | | | 60/772 |
| 2006/0260323 A1* | 11/2006 | Moulebhar | F01D 21/003 |
| | | | 60/793 |
| 2007/0151258 A1* | 7/2007 | Gaines | F02C 7/36 |
| | | | 60/792 |
| 2007/0277532 A1* | 12/2007 | Talan | F02C 3/113 |
| | | | 60/792 |
| 2007/0289310 A1 | 12/2007 | Dooley et al. | |
| 2009/0015011 A1 | 1/2009 | Colin et al. | |
| 2010/0086403 A1 | 4/2010 | McCune | |
| 2011/0296847 A1* | 12/2011 | Williams | B21D 53/50 |
| | | | 60/796 |
| 2013/0098059 A1 | 4/2013 | Suciu et al. | |
| 2013/0319006 A1* | 12/2013 | Parnin | F01D 25/18 |
| | | | 60/805 |
| 2015/0033890 A1* | 2/2015 | Pettinotti | F01D 25/164 |
| | | | 74/423 |
| 2015/0275758 A1* | 10/2015 | Foutch | F02C 7/047 |
| | | | 60/779 |
| 2015/0354407 A1 | 12/2015 | Anglin | |
| 2015/0377066 A1 | 12/2015 | Duong et al. | |
| 2017/0051672 A1* | 2/2017 | Nowakowski | F01D 25/162 |
| 2017/0284302 A1* | 10/2017 | Roberge | F01D 25/28 |
| 2017/0314411 A1* | 11/2017 | Roberge | F01D 15/12 |
| 2017/0335774 A1* | 11/2017 | Moniz | F02C 7/36 |
| 2018/0156121 A1* | 6/2018 | Snape | F02C 7/185 |
| 2018/0266329 A1* | 9/2018 | Mackin | F02C 7/36 |

\* cited by examiner

ANTI-WINDMILLING SYSTEM FOR A GAS TURBINE ENGINE

TECHNICAL FIELD

The present disclosure relates generally to anti-windmilling systems for a gas powered turbine.

BACKGROUND

Geared turbofan engines utilize a gas powered turbine engine to drive rotation of a fan through a gearing system. The gas powered turbine engine includes a compressor that draws in and compresses air, a combustor that mixes compressed air with a fuel and ignites the mixture, and a turbine across which the combustion products are expanded. The expansion of the combustion products across the turbine drives the turbine to rotate. Rotation of the turbine is communicated to the compressor via a shaft and drives rotation in the compressor as well. The rotation of the shaft is translated through the gearing system to the fan, which is positioned fore of the compressor.

When a geared turbofan engine is shut down while on the ground, such as when the aircraft in which the geared turbofan is installed is parked at an airfield, crosswinds entering the geared turbofan can drive rotation of the fan. The fan rotation can be either clockwise or counterclockwise, dependent on the direction of the wind, relative to the forward face of the aircraft engine. This rotation is referred to as windmilling.

Rotation of the fan, in turn, is translated to the shaft through the gearing system. In some geared turbofans, one or more components within the engine require active lubrication while the engine is rotating in order to prevent damage or deterioration to the engine systems.

SUMMARY OF THE INVENTION

In one exemplary embodiment a gas turbine engine includes a compressor having a first compressor section and a second compressor section, a combustor fluidly connected to the compressor, a turbine fluidly connected to the combustor, the turbine having a first turbine section and a second turbine section, a first shaft connecting the first compressor section and the first turbine section, a second shaft connecting the second compressor section and the second turbine section, a fan connected to the first shaft via a geared architecture, a low speed accessory gearbox interfaced with the first shaft via a mechanical interface, and the low speed accessory gearbox including a mechanical brake.

In another exemplary embodiment of the above described gas turbine engine the mechanical interface is disposed in an intermediate case section.

In another exemplary embodiment of any of the above described gas turbine engines the mechanical interface is disposed proximate a fan drive gear system.

In another exemplary embodiment of any of the above described gas turbine engines the mechanical interface is disposed aft of the first turbine section.

In another exemplary embodiment of any of the above described gas turbine engines the mechanical interface is a beveled gear interface connecting a tower shaft to the first shaft.

Another exemplary embodiment of any of the above described gas turbine engines further includes a controller including a memory storing instructions for causing the controller to activate the mechanical brake in response to a detected low speed shaft rotational speed falling below a threshold speed during engine shutdown.

In another exemplary embodiment of any of the above described gas turbine engines the low speed accessory gearbox is interfaced with at least one engine system and is configured to provide rotational power to the at least one engine system.

In another exemplary embodiment of any of the above described gas turbine engines the mechanical brake is configured to prevent rotation within the low speed accessory gearbox while in an engaged state.

In another exemplary embodiment of any of the above described gas turbine engines the fan drive gear system includes at least one journal bearing.

In another exemplary embodiment of any of the above described gas turbine engines the mechanical brake is a control actuated feature operable to physically engage a gear in the low speed accessory gearbox.

In one exemplary embodiment a gas turbine engine includes a compressor having a first compressor section and a second compressor section, a combustor fluidly connected to the compressor, a turbine fluidly connected to the combustor, the turbine having a first turbine section and a second turbine section, a first shaft connecting the first compressor section and the first turbine section, a second shaft connecting the second compressor section and the second turbine section, a fan connected to the first shaft via a geared architecture, and a brake interfaced with the first shaft via at least one gear system.

In another exemplary embodiment of the above described gas turbine engine the brake is a mechanical brake.

In another exemplary embodiment of any of the above described gas turbine engines the brake includes a magnetic brake.

In another exemplary embodiment of any of the above described gas turbine engines the brake includes an electro-mechanical brake.

In another exemplary embodiment of any of the above described gas turbine engines the brake is integrated into an accessory gearbox connected to the first shaft.

In another exemplary embodiment of any of the above described gas turbine engines the brake is interfaced with a fan drive gear system.

An exemplary method for preventing rotation of a shaft in a gas turbine engine includes preventing rotation of a gear system within a low speed accessory gearbox via application of a brake, and preventing rotation of a fan drive gear system when the brake is applied via a mechanical interface between the low speed accessory gearbox and the fan drive gear system.

In another example of the above described exemplary method for preventing rotation of a shaft in a gas turbine engine application of the brake is performed in response to a rotation speed of a low shaft falling below a speed threshold.

Another example of any of the above described exemplary methods for preventing rotation of a shaft in a gas turbine engine further includes powering a lubrication system during an engine shutdown sequence at least until the brake is applied.

In another example of any of the above described exemplary methods for preventing rotation of a shaft in a gas turbine engine the lubrication system provides lubrication to at least one journal bearing within the fan drive gear system.

These and other features of the present invention can be best understood from the following specification and drawings, the following of which is a brief description.

DETAILED DESCRIPTION OF AN EMBODIMENT

Figure 1:
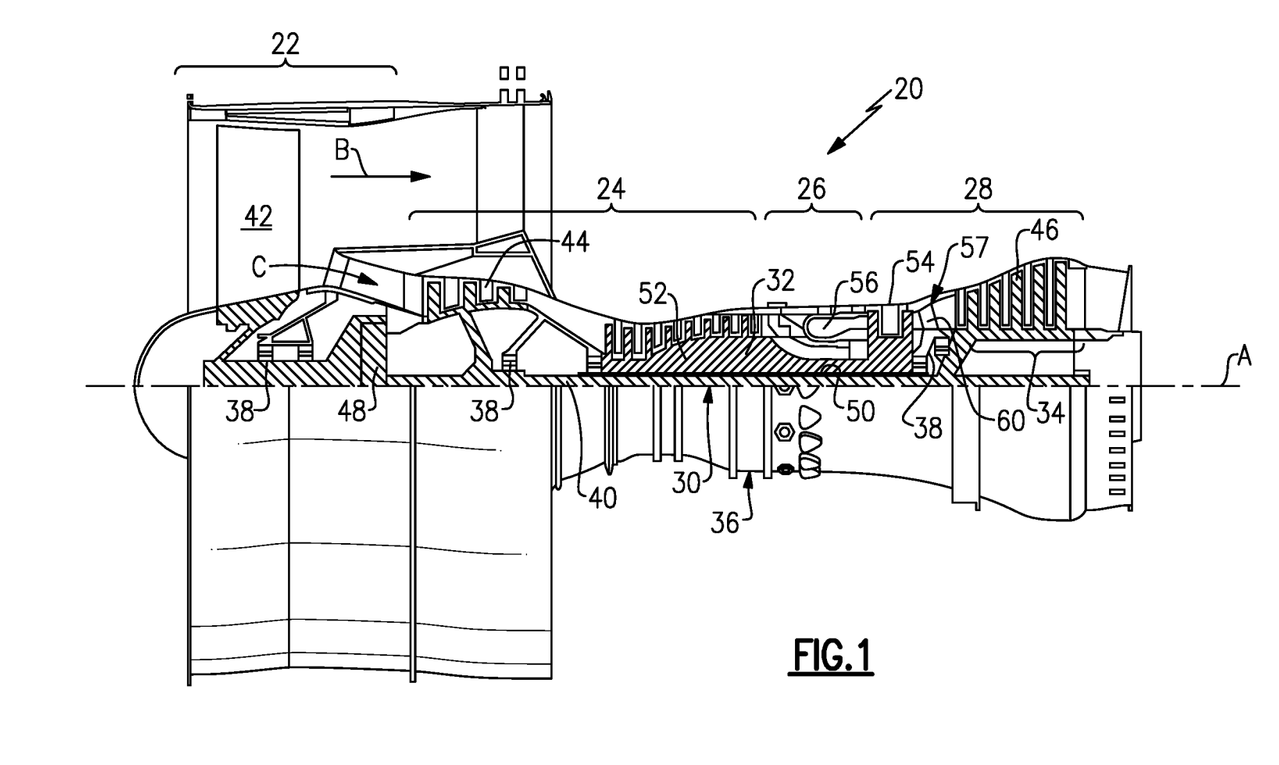
FIG. 1 schematically illustrates an exemplary gas powered turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (1066.8 meters). The flight condition of 0.8 Mach and 35,000 ft (1066.8 m), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/s).

Some example geared turbofan engines are subject to rotation of the fan, and connected components, due to wind or other atmospheric conditions while the engine is on the ground at rest and inoperative. This rotation is otherwise referred to as windmilling, and can cause rotation in either a clockwise or counter-clockwise direction depending on the direction of the prevailing wind relative to the engine. Further, some example geared turbofan engines include components, such as journal bearings in a fan drive gear system, that are highly sensitive to wear in the absence of active provision of lubrication. A delay between an initial occurrence of windmilling and application of either a lubricant or of an anti-windmilling system can result in undesirable wear on the internal engine components. Such a delay is present in systems that utilize rotation due to windmilling to activate a brake or to power a lubrication system. Further, typical active lubrication systems utilize rotation of the engine to drive lubricant, and no lubricant is provided while the engine is inoperative.

Figure 2:
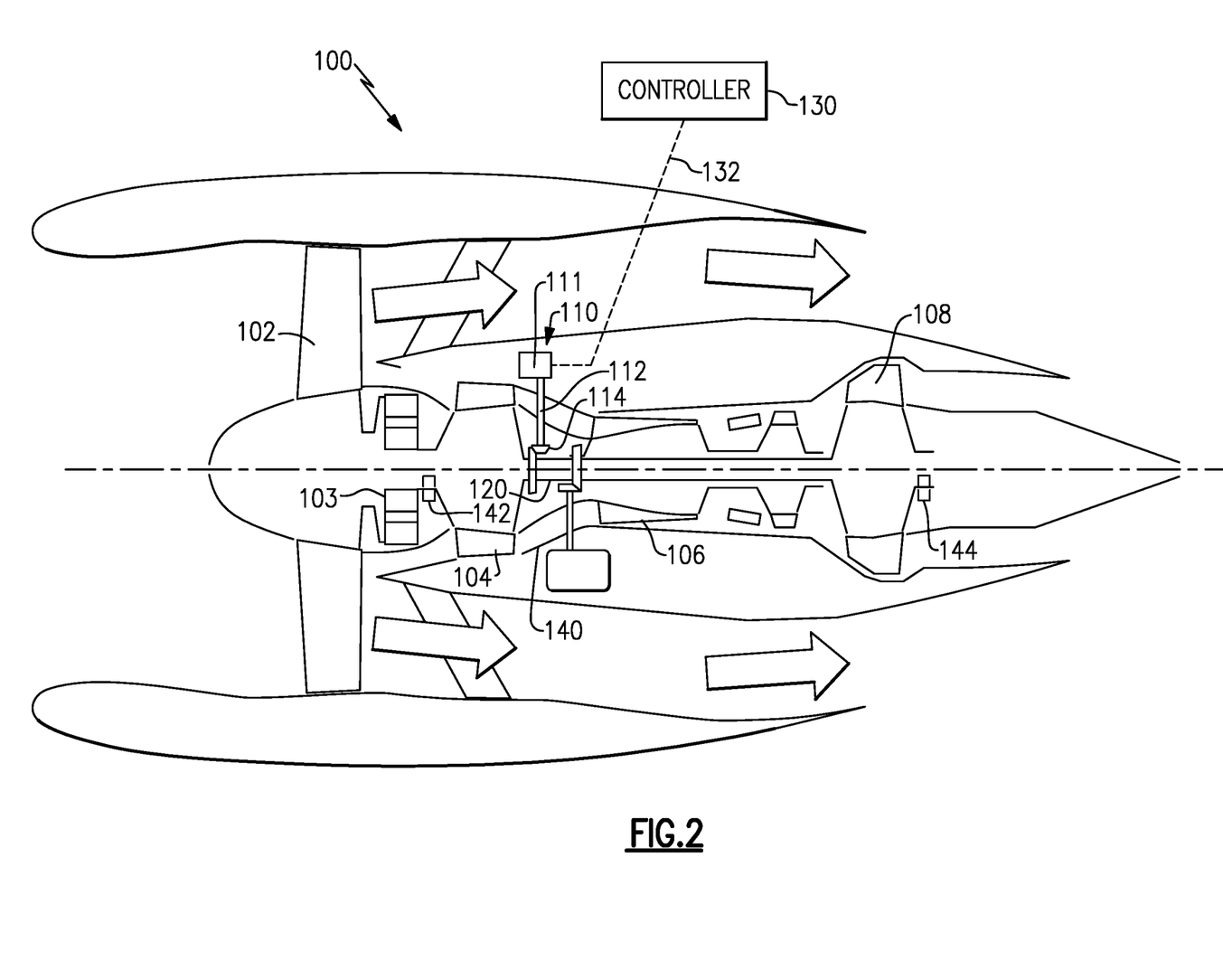
FIG. 2 schematically illustrates an exemplary gas powered turbine engine including a geared anti-windmilling system.

With continued reference to FIG. 1, FIG. 2 schematically illustrates a gas turbine engine 100 including a mechanical anti-windmilling system 110. The anti-windmilling system 110 of FIG. 2 includes brake 111 interfaced with a low speed shaft 120 via a power take-off gearing system. The illustrated gearing system utilizes a tower shaft 112 connected to the low speed shaft 120 via a beveled gear 114. The anti-windmilling system 110 is connected to a controller 130 via a control connection 132. The controller 130 is, in some examples, a general aircraft controller configured to control multiple aircraft systems. In alternative examples, the controller 130 is a dedicated anti-windmilling controller communicatively coupled with general engine controllers, and configured to lock a fan 102 in order to prevent windmilling.

In the example of FIG. 2, the anti-windmilling system 110 is supported by an engine static structure in an intermediate case section 140 of the gas turbine engine 100. The intermediate case section 140 is positioned between a low pressure compressor section 104 and a high pressure compressor section 106. The intermediate case section includes one or more struts configured to allow the passage of the towershaft 112 through the primary flowpath. In alternative examples, the anti-windmilling system 110 is positioned proximate a fan drive gear system 103 at position 142. In yet further alternative examples, the anti-windmilling system 110 is positioned aft of a low pressure turbine section 108 at position 144.

The brake 111 is any brake configuration strong enough to cease rotation of the fan 102 when the fan 102 is no longer being driven and is rotating below a shutoff threshold, and strong enough to prevent rotation of the fan 102 while the engine 100 is inoperative. By way of example, the brake 111 can be a purely mechanical brake, an electromechanical brake, a magnetic brake, or any similar brake type. When the brake 111 is applied to the tower shaft 112, rotation of the tower shaft 112 is prevented. This, in turn, prevents rotation of the bevel gear 114, and rotation of the low speed shaft 120. As the low speed shaft 120 is interfaced with the fan 102 through the fan drive gear system 103, the brake 111 preventing the low speed shaft 120 from rotating also prevents the fan 102 from rotating, thereby preventing windmilling from occurring.

Figure 3:
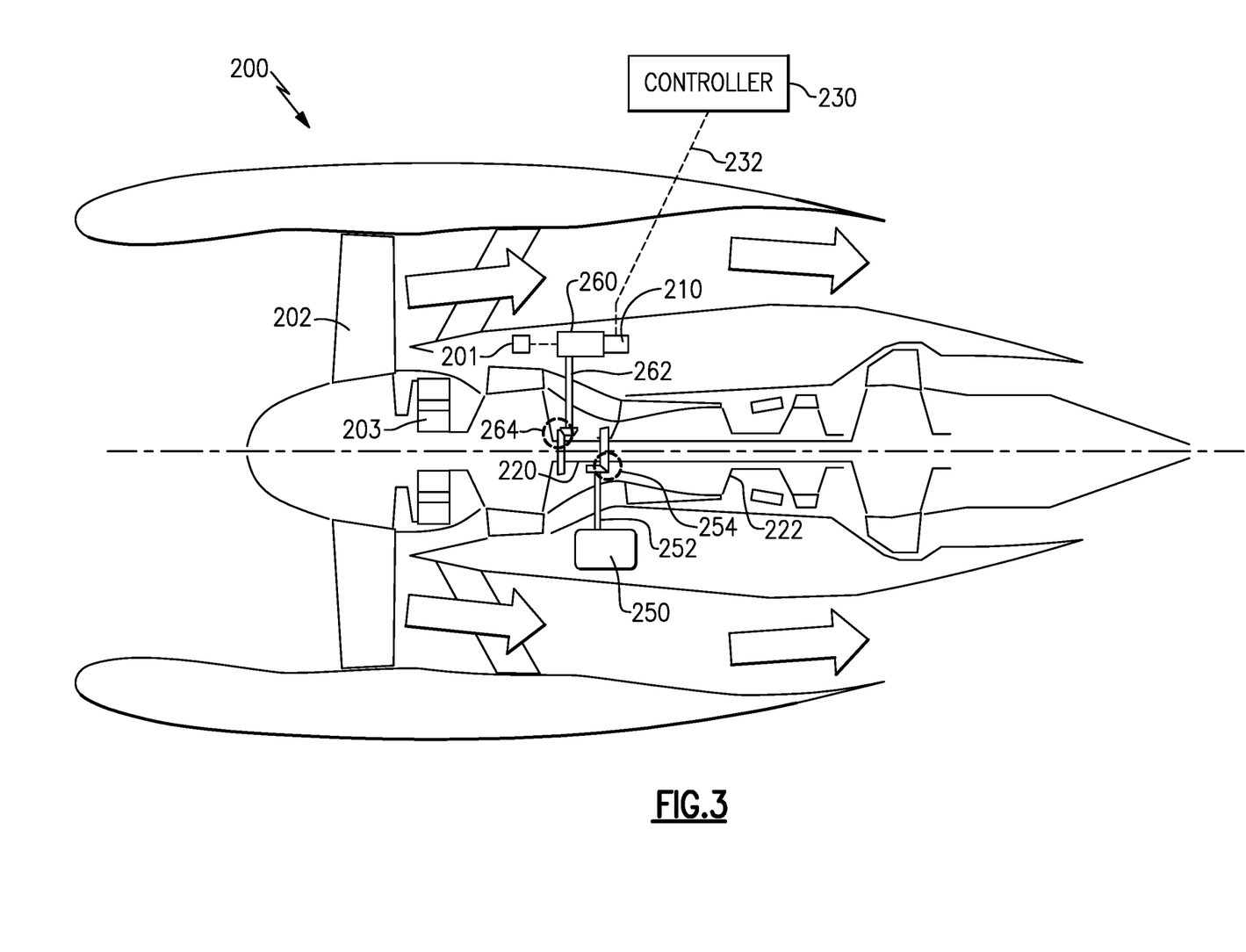
FIG. 3 schematically illustrates an alternative exemplary gas powered turbine engine including an accessory gear box incorporating an anti-windmilling system.

With continued reference to FIG. 2, and with like numerals indicating like elements, FIG. 3 schematically illustrates an alternate example gas turbine engine 200. In some example engines, it can be desirable to extract rotational power from the shafts 220, 222, and provide the rotational power to other systems within the gas turbine engine 200. Depending on the magnitude of power desired to be extracted, the power can be extracted through a high speed accessory gearbox 250, and/or a low speed accessory gearbox 260. The high speed accessory gearbox 250 is connected to the high speed shaft 222 via a high speed tower shaft 252 and a beveled gear connection 254. Typically the high speed accessory gearbox 250 would include a starter interface to transmit rotational power used to rotationally accelerate the high spool shaft 222 during an engine start sequence. Similarly, the low speed accessory gear box is connected to the low speed shaft 220 via a low speed tower shaft 262 and a beveled gear connection 264. In alternative examples, alternative mechanical interfaces can be utilized in place of the described tower shaft and bevel gear.

In alternative examples, the accessory gearboxes 250, 260 can be connected to the corresponding shafts 220, 222 via alternative gearing systems configured to translate rotation of the corresponding shaft 220, 222 into the accessory gearbox 250, 260. Each of the accessory gearboxes 250, 260 includes a gearing system that can be interconnected with other engine systems 201 and can function to provide rotational power to the other engine systems. The illustrated location of the other engine systems 201 is purely for explanatory purposes, and does not correlate to the actual location of any engine system that may be interfaced with the low speed accessory gearbox 260.

In systems including a low speed accessory gearbox 260, braking of the low speed shaft 220 for anti-windmilling can be achieved by interfacing the brake system with the low speed accessory gearbox 260, and does not require a distinct brake tower shaft.

In the example of FIG. 3, a brake 210 is connected to, and interfaced with, the low speed accessory gearbox 260. The brake 210 is configured to manually engage a gearing system within the low speed accessory gearbox 260 in response to an actuation signal from a controller 230. The controller 230 is connected to the brake 210 via a control signal line 232. As with the example of FIG. 2, the controller 230 can be a general engine controller configured to operate the brake 210 or a dedicated brake controller configured to control operations of the brake 210.

In one example operation, the brake 210 is typically in an unengaged state. When the controller 230 detects that the engine 200 has begun a shutdown sequence, the controller 230 monitors the speed of the low speed shaft 220 using a shaft speed sensor. When the shaft speed falls below a predetermined threshold, the controller transmits a control signal along the control signal line 232. The control signal causes the brake 210 to engage with the gearing inside the accessory gearbox 260. Engagement of the brake 210 can be in the form of a physical interfacing, application of an electromechanical brake, or engagement of a magnetic brake within the accessory gearbox 260. In some examples, the predetermined threshold is a speed below which the brake 210 is able to cease rotation of the fan 202 while rotation of the high speed shaft 222 continues to provide lubricant through an active lubrication system to any engine systems that need lubrication.

Engagement of the brake 210 prevents rotation of the gearing system inside the low speed accessory gearbox 260. The rotation prevention is translated through the tower shaft 262, into the low speed shaft 220, and ultimately through the fan drive gear system 203, thereby preventing the fan 202 from rotating due to windmilling.

Figure 4:
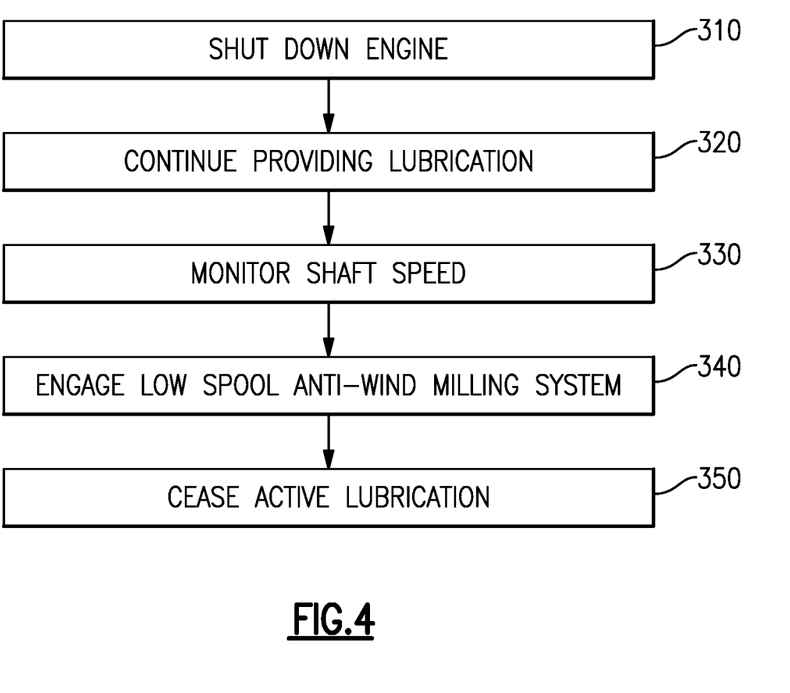
FIG. 4 is a flowchart demonstrating an example operation of an anti-windmilling system according to any of the examples described herein.

With continued reference to FIGS. 2 and 3, FIG. 4 illustrates an exemplary method of operating an anti-windmilling system in a gas turbine engine including components, such as journal bearings, that require active lubrication. Initially, an instruction from a general aircraft controller begins a shutdown sequence of the gas turbine engine in a "shut down engine" step 310. In alternative systems, the engine controller can also be in communication with various other vehicle sensors, including, but not limited to, weight on wheels sensors and vehicle velocity sensors. Such sensors allow the engine controller to determine if the aircraft is on the ground (weight on wheels) and if the aircraft has stopped moving (vehicle velocity). These determinations allow the controller to prevent the anti-windmilling lock from being applied while the aircraft is moving in flight or on the ground.

During the shutdown sequence, while portions of the engine are still rotating, lubricant is provided to any engine systems requiring active lubrication in a "continue providing lubrication" step 320. The lubrication in the active lubrication system is driven by rotation of a high speed shaft, which is in turn driven by rotation of a high pressure turbine.

Also during this time period, a controller monitors the rotational shaft speeds of both a low speed shaft, driven by a low pressure compressor, and the high speed shaft in a "monitor shaft speed" step 330. Due to rotational speeds and inertia, the low speed shaft will reduce speed to approximately zero substantially before the high speed shaft. As a result, lubrication can be provided from the active lubrication system for a time period up until, and potentially after, the low speed rotor shaft stops rotating.

When the shaft speed of the low speed shaft falls below a predetermined threshold during shutdown operations, the engine controller engages the anti-windmilling system in an "engage low spool anti-windmilling system" step 340. To engage the anti-windmilling system, the controller signals a brake within, or connected to, a low speed accessory gearbox to engage. Engaging the brake prevents rotation of the low speed shaft, and the connected fan drive gear system. The predetermined threshold speed is a speed below which the brake is sufficiently able to stop rotation of the low speed shaft and the fan drive gear system. The brake remains engaged until an initiation of engine startup routine, or until a manual override is provided.

In alternative systems, the engine controller can be in communication with various other vehicle sensors, including, but not limited to, weight on wheels sensors and vehicle velocity sensors. Such sensors allow the engine controller to determine if the aircraft is on the ground (weight on wheels) and if the aircraft has stopped moving (vehicle velocity). These determinations allow the controller to prevent the anti-windmilling lock from being applied while the aircraft is moving in flight or on the ground.

Once the brake has been engaged, the active lubrication system is allowed to naturally cease operations in a "cease active lubrication" step 350. While the high speed shaft continues to rotate, lubrication is continuously actively applied via the lubrication system. As the high speed shaft naturally ceases rotating, due to no longer being driven, the active lubrication also ceases being driven. This is referred to as naturally ceasing operations of the active lubrication system. In alternative examples, the active lubrication system can be actively prevented from providing lubrication during this step 350. As the low speed shaft is physically prevented from rotating by the brake, the lubrication to critical components such as journal bearings is not necessary. During a startup sequence of the gas turbine engine, the low spool anti-windmilling system is disengaged, and the active lubrication is restarted prior to beginning rotation of the low speed shaft.

Due to this sequence, components within the fan drive gear system, or any other system connected to the low speed shaft, that require active lubrication are not in a designed condition where the components are rotating, and active lubrication is not provided. Further, while described above as a part of the shutdown sequence of the engine, one of skill in the art will understand that the system for preventing windmilling can be applied any time the engine is inoperative, and is not limited to engine shutdown and startup sequences.

While described above with regards to bearing systems requiring active lubrication, one of skill in the art will recognize that the described anti-windmilling system can be utilized within geared turbofan systems that do not include components sensitive to wear resulting from windmilling. By way of example, a manual operation of the anti-windmilling system can facilitate inspection/repair of a geared turbofan engine by allowing a maintenance worker to lock the fan during engine inspection or maintenance. Such a lock allows the maintenance worker to perform work on the engine without relocating the engine, or aircraft, to an environment that is not subject to wind. Further, one of skill in the art having the benefit of this disclosure could envision any number of additional uses of the above described anti-windmilling system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor having a first compressor section and a second compressor section;
a combustor fluidly connected to the compressor;
a turbine fluidly connected to the combustor, the turbine having a first turbine section and a second turbine section;
a first shaft connecting the first compressor section and the first turbine section;
a second shaft connecting the second compressor section and the second turbine section;
a fan connected to said first shaft via a geared architecture;
a low speed accessory gearbox interfaced with the first shaft via a mechanical interface, and interfaced with at least one engine system other than the first shaft, the low speed accessory gearbox being configured to provide rotational power to the at least one engine system; and
the low speed accessory gearbox including a mechanical brake.

2. The gas turbine engine of claim 1, wherein the mechanical interface is disposed in an intermediate case section.

3. The gas turbine engine of claim 1, wherein the mechanical interface is disposed proximate the geared architecture.

4. The gas turbine engine of claim 1, wherein the mechanical interface is disposed aft of the first compressor section.

5. The gas turbine engine of claim 1, wherein the mechanical interface is a beveled gear interface connecting a tower shaft to said first shaft.

6. The gas turbine engine of claim 1, further comprising a controller including a memory storing instructions for causing the controller to activate the mechanical brake in response to a detected low speed shaft rotational speed falling below a threshold speed during engine shutdown.

7. The gas powered turbine engine of claim 1, wherein the mechanical brake is configured to prevent rotation within the low speed accessory gearbox while in an engaged state.

8. The gas powered turbine engine of claim 1, wherein the geared architecture includes at least one journal bearing.

9. The gas powered turbine engine of claim 1, wherein the mechanical brake is a control actuated feature operable to physically engage a gear in the low speed accessory gearbox.

10. A gas turbine engine comprising:
a compressor having a first compressor section and a second compressor section;

a combustor fluidly connected to the compressor;

a turbine fluidly connected to the combustor, the turbine having a first turbine section and a second turbine section;

a first shaft connecting the first compressor section and the first turbine section;

a second shaft connecting the second compressor section and the second turbine section;

a fan connected to said first shaft via a first geared architecture; and a brake interfaced with the first shaft via at least a second geared architecture, wherein the brake is integrated into an accessory gearbox connected to said first shaft and the accessory gearbox is interfaced with at least one engine system other than the first shaft, the accessory gearbox being configured to provide rotational power to the at least one engine system.

11. The gas turbine engine of claim 10, wherein the brake is a mechanical brake.

12. The gas turbine engine of claim 10, wherein the brake includes a magnetic brake.

13. The gas turbine engine of claim 10, wherein the brake includes an electromechanical brake.

14. A method for preventing rotation of a shaft in a gas turbine engine comprising:

preventing rotation of a gear system within a low speed accessory gearbox via application of a brake, wherein the low speed accessory gearbox is interfaced with at least one engine system other than a low speed engine shaft, is interfaced with the low speed engine shaft, and is configured to provide rotational power to the at least one engine system; and preventing rotation of a fan drive gear system when said brake is applied via a mechanical interface between said low speed accessory gearbox and said fan drive gear system.

15. The method of claim 14, wherein application of the brake is performed in response to a rotation speed of a low shaft falling below a speed threshold.

16. The method of claim 15, further comprising powering a lubrication system during an engine shutdown sequence at least until said brake is applied.

17. The method of claim 16, wherein the lubrication system provides lubrication to at least one journal bearing within the fan drive gear system.

* * * * *